Oct. 30, 1962 KIYOSHI INOUE 3,061,712

METHOD OF PRODUCING SEMICONDUCTORS AND SEMICONDUCTOR ELEMENTS UTILIZING ELECTRIC SPARK DISCHARGE

Filed Aug. 30, 1960

KIYOSHI INOUE

INVENTOR.

BY Ralf F. Ross

AGENT.

United States Patent Office 3,061,712
Patented Oct. 30, 1962

3,061,712

METHOD OF PRODUCING SEMICONDUCTORS AND SEMICONDUCTOR ELEMENTS UTILIZING ELECTRIC SPARK DISCHARGE

Kiyoshi Inoue, 182 3-chome, Tamagawayoga-machi, Setagaya-ku, Tokyo-to, Japan

Filed Aug. 30, 1960, Ser. No. 52,907
Claims priority, application Japan Aug. 31, 1959
10 Claims. (Cl. 219—100)

This invention relates to methods of producing semiconductors and semiconductor elements, and more particularly it relates to a new and improved method of producing impurity semiconductors, wherein an intermetallic compound having semiconductive characteristics is obtained by mutually interdiffusing a plurality of kinds of elements through the utilization of electric spark discharging, and an impurity element is diffused into a single-element semiconductor or an intermetallic compound semiconductor.

Heretofore, various methods have been proposed along these lines for producing semiconductors. For example, for the production of intermetallic compounds, quantities of the component elements corresponding to their respective chemical equivalents have been placed in a graphite furnace and melted in an inert gas; oxygen treatment has been accomplished by adding other component elements to a vapor-deposition film of the element substance which is to be the base or foundation; or a portion of the component elements has been added to the vapor-deposition surface of the element substance which is to be the base, vacuum evaporation has been carried out again with another portion of the elements, a vapor of still another portion of the elements has been added, and the remaining portion of the elements has been added for activation. In all of the above-mentioned cases, their production methods have been extremely complicated and have required a high degree of operational skill. Moreover, for the production of an impurity semiconductor, it has been necessary to introduce impurities by a zone leveling process, or some other process, into a high-purity semiconductor obtained by a zone refining method. Accordingly, a considerable amount of time and skill has been necessary for production.

It is a general object of the present invention to provide a new and improved method whereby semiconductors of various types, as desired, and of excellent properties can be produced by comparatively simple process steps without the above-mentioned difficulties and disadvantages.

It is another object of the invention to provide a new method wherein, through the utilization of electric spark discharging, a plurality of elements are mutually interdiffused to produce a semiconductor.

It is yet another object of the invention to provide a new method wherein, through the utilization of electric spark discharging, an impurity substance is added to an inherent semiconductor, and, by further subjecting the same to a new dispersion measure, a PN junction element is produced.

The foregoing objects as well as other objects and advantages of the invention may be achieved, in general, by adapting the component elements which are to form the semiconductor as electrodes, causing electric spark discharging to take place between these electrodes, and thereby causing the element substances which constitute these electrodes to interdiffuse mutually to produce a semiconductor substance; or by causing to diffuse, on a metallic electrode surface, another element to produce a semiconductor element.

By the practice of the present invention, an intermetallic compound semiconductor of elements of group III and group V of the periodic table; a P-type or N-type impurity semiconductor to which an impurity element of group III or group V has been added with respect to a single-element semiconductor such as germanium or silicon; a P-type or N-type impurity semiconductor consisting of an intermetallic semiconductor; a semiconductor element obtained by causing to diffuse, on one kind, or more than one kind, of metallic surface, another element; and other products such as a PN-type junction element can be produced in a simple manner.

The details of the invention will be more clearly apparent by reference to the following detailed description of a few representative embodiments of the invention when taken in connection with the accompanying drawing in which the same or equivalent parts are designated by the same reference numerals, and in which.

Figure 1:
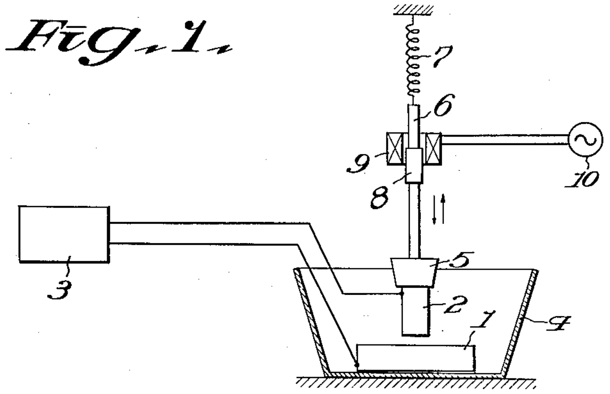
FIG. 1 is a schematic elevational view, partly in section, showing an apparatus for adapting the component elements of the semiconductor to be produced as electrodes, causing electric spark discharging to take place, and thereby to cause the elements of the said electrodes to interdiffuse mutually.

Referring to FIG. 1, the principal members of the apparatus are electrodes 1 and 2 made of the substances which are to be interdiffused. Said electrodes are connected to respective terminals of an electric power source 3 for generating an impulse wave and are so disposed in the apparatus as to confront each other in a manner suitable for electric spark discharging therebetween. The electrode 1 rests on the bottom of a processing vessel 4, while the electrode 2 is held thereabove by an electrode holding chuck 5, which is fixedly supported by spindle 6. Said spindle 6 is suspended elastically at its upper end by a spring 7 and is wrapped at a midportion thereof by a concentric, magnetic substance 8, about which an electric coil 9 is so supported as to encompass, without mechanical contact, the said magnetic substance 8. The terminals of said coil 9 are connected to an alternating-current power source 10, which supplies energizing power during operation.

In the operation of the apparatus as above described, the two electrodes 1 and 2 are made to approach one another to a suitable distance, and an impact voltage is impressed across the said electrodes 1 and 2, whereupon an electric spark discharge is created between said electrodes. The aforesaid coil 9 is adapted to be energized simultaneously with the creation of said electric spark discharge, whereby the spindle 6 is caused to undergo vertical vibration as indicated by the arrows in FIG. 1.

The said spark discharge between the two electrodes 1 and 2 causes the elements composing said electrodes to become heated to a high temperature, to become molten, and to consume each other and fuse together. In general, the consumption of the electrode material connected to the positive pole is greater than that of the electrode material connected to the negative pole. With this phenomenon in view and with full consideration of such factors as the kinds of electrode materials, the polarities of the electric power source may be suitably switched.

Moreover, in cases wherein it is difficult to form the substance to be diffused into the form of an electrode, the said substance may be pulverized and deposited as a coating on a base metal electrode, and the said base electrode utilized for the creation of the electric spark discharge.

The practice of causing the spindle 6 to be vibrated by the electromagnetic coil 9 so as to cause the electrode 2 to vibrate relative to the electrode 1 and undergo contacting and separating motion is not always absolutely necessary, but, by causing the electrodes to undergo said motion relative to each other, it is possible to obtain the desired diffusion action with remarkably high efficiency. The reason for this advantage may be explained as follows: By causing the said contacting and separating motion to take place, the two electrodes, which are in a molten state due to the creation of a spark therebetween, are brought into contact. Then, with a portion of the electrode material element of one electrode in interfused state with the electrode material element of the other electrode, the two electrodes are drawn apart again, whereupon an electric spark discharge is created and melting occurs again. It will be appreciated that, as a result of the above action, the two electrode materials are fused together and caused to be mutually interdiffused with high efficiency.

In the arrangement of the above-described embodiment, only a simple, representative example of a vibration-generating mechanism for producing the contacting and separating motion of the electrodes 1 and 2 has been presented, and this aspect of the invention is not intended to be limited to the vibration-generating mechanism indicated herein as an example. It is obvious that, as a means for generating vibration, persons skilled in the art may readily utilize any of various known devices.

Figure 2:
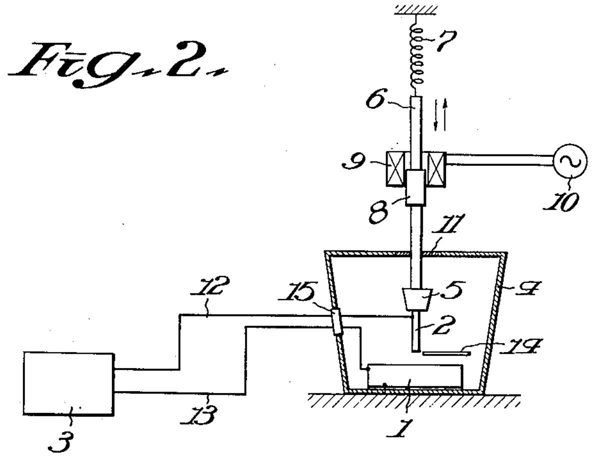
FIG. 2 is a schematic view, similar to FIG. 1, illustrative of embodiments of the invention for the case where the component elements are readily volatile and the case where the number of component elements is three or more.

Referring now to FIG. 2, the arrangement shown therein is almost the same as that shown in FIG. 1, the only difference between the two being the fact that the processing vessel 4 shown in FIG. 2 is fully closed. In FIG. 2, the electrodes 1 and 2 are composed of the substances which are to be interdiffused or are electrodes coated with the substances which are to be interdiffused. These two electrodes are connected to an electric power source 3 for generating shock waves. As in the arrangement of FIG. 1, the electrode 1 rests on the bottom of the processing vessel 4, but in FIG. 2 said vessel 4 is closed about the aforesaid electrodes 1 and 2 disposed therein. Also as in the arrangement of FIG. 1, the electrode 2 is held by an electrode holding chuck 5, which is fixed to a spindle 6, which, in turn is suspended by a spring 7; a magnetic member 8 is fixed about a mid-portion of the spindle 6; and an energizing coil 9 for generating vibration by being energized by an alternating-current power source 10 is disposed about the magnetic member 8.

At the top of the processing vessel 4, a sealing device 11, which is made of a flexible material, is provided for the insertion of the spindle 6 and is so constructed as to be freely movable in conformance with the axial vibration of the spindle 6. For leading the lead wires from the power source 3, serving to transmit an impulse wave to the electrodes 1 and 2, into the sealed processing vessel 4, the installation of a lead connector 15 on the side wall of the processing vessel 4 is preferable. By the provision of this lead connector 15, the lead wires within and without the processing vessel 4 are electrically connected, and, at the same time, it is possible to seal the processing vessel 4 hermetically.

By hermetically sealing the processing vessel 4 as shown in FIG. 2, several substantial advantages are gained in the production of semiconductors as will be described herebelow.

During operation, the spark discharge created between the electrodes 1 and 2 causes the said electrodes to be heated to high temperatures, whereby the elements composing the electrodes may be oxidized in some cases. In such cases, this oxidation can be easily prevented by providing an atmosphere of an inert gas or a reducing gas about said electrodes.

Furthermore, if necessary, it is a simple matter to place the discharge gap in an atmosphere of special vapor, for example, oxygen or potassium vapor.

Also, in cases wherein the elements to be interdiffused are highly volatile, or wherein the elements to be interdiffused are in the vapor phase or a gaseous state, it is possible to effect interdiffusion with great effectiveness.

Depending on the necessity, moreover, it is possible, by placing the entire processing vessel 4 within a themostatic bath, to vary the surrounding temperature for effecting the interdiffusion.

By a further modification indicated in FIG. 2, that is, by disposing a third element 14 to be interdiffused in the vicinity of the electrodes 1 and 2, it is possible to interdiffuse said third element 14 together with the elements composing the electrodes 1 and 2. Here, although it is preferable that the third element 14 be one which is volatile, it need not invariably be such an element. For instance, thorough interdiffusion can be accomplished by making the element 14 in a pulverized form or in the form of a thin foil and disposing it above the electrode 1. Moreover, by sealing in a metallic vapor, for example, potassium vapor, within the processing vessel 4, it is possible to cause diffusion of the metallic vapor.

Furthermore, as was mentioned in the description in conjunction with FIG. 1, in cases where it is difficult to form electrodes from the elements to be diffused, the said elements may be pulverized and suitably applied as coatings on base metallic electrodes, and spark discharging caused to take place between the said base metallic electrodes by the power source 3 for generation of shock waves. In such cases, in order to prevent the mixing in of the base metallic elements composing the base metallic electrodes, it is preferable to apply a coating of powder of the element to be diffused on the negative electrode side, which has a relatively low rate of consumption.

In an actual example of production of an intermetallic compound semiconductor by the method of the invention, with the use of an apparatus as indicated in FIG. 1, cadmium (Cd) was adapted as the positive electrode, and pulverized tellurium (Te) was sprinkled as a coating on an iron base electrode and adapted as the negative electrode. Then, by imparting vibration to the two electrodes so as to cause them to contact and separate as electric spark discharging was caused to take place between the said electrodes, it was possible to produce an intermetallic compound CdTe on the surface of the base electrode.

In another actual instance with an apparatus as indicated in FIG. 2, indium (In) was connected to the negative terminal of the power source, and cadmium (Cd) was connected to the positive terminal. As the third element, silver (Ag) was disposed in the proximity of both electrodes. With the use of the apparatus thus arranged, it was possible to obtain an intermetallic compound $AgInTe_2$ on the surface of the indium electrode.

Both of the intermetallic compounds CdTe and $AgInTe_2$ were analyzed by means of an X-ray analyzer, and their respective substances produced were verified.

The above-described instances confirm that the method of the present invention is effective for the production of intermetallic compounds. They also indicate that this aspect of the practice of this invention need not be limited to the above-described arrangements. That is, by using a necessary component element as an electrode and disposing it in the proximity of another electrode, or by introducing said element as an environmental vapor, and by causing mutual interdiffusion through the utilization of the heat generated by electric spark discharging, an intermetallic compound can be produced.

The method of the present invention is further effective in the production also of elements which exhibit electrical surface phenomena, particularly elements which cause such actions as rectifying action, photoelectric effect, and the Peltier effect due to the coupling of heterogeneous metals or of a metal and a semiconductor, or photoconductive action.

In the conventional method of producing selenium rectifying elements practiced heretofore, molten selenium has been applied as a very thin film on a base plate of, for example, aluminum, and heat treated. However, recent studies have revealed that the rectifying action of a selenium rectifying element is due to the electrical surface phenomenon arising during the diffusion which occurs on the contact surfaces of aluminum and selenium.

Experiments have been undertaken by me for the production of selenium rectifying elements. By using an apparatus as indicated in FIG. 2 and causing electric spark discharging to take place in a process environment of an inert gas, I was able to produce a diffused surface of selenium and aluminum having rectifying property.

In the above-mentioned application, the aluminum was connected to the negative terminal and the selenium was connected to the positive terminal. As vibration was imparted so as to cause the surfaces of the selenium electrode and the aluminum electrode to contact and separate repeatedly, electric spark discharging was generated between the two said electrodes, and the spark discharge surface was moved so as to cause the diffused surface to develop uniformly over the surface of the aluminum.

Figure 3:
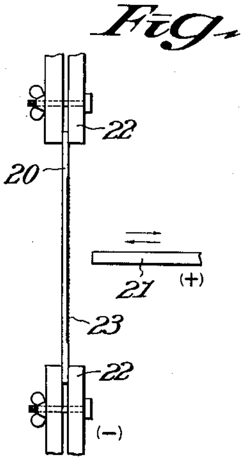
FIG. 3 is a schematic view, with some parts broken away, illustrative of an embodiment for the case where, into the surface of a metal in plate form, another element is caused to diffuse, for example, in the production of a selenium rectifier element.

The above-mentioned process may be described in greater detail as follows in conjunction with FIG. 3. An aluminum electrode 20, made in the form of a plate, was held by electrode holding heads 22. A selenium electrode 21 was caused to vibrate with respect to the electrode 20. During the process the selenium electrode 21 was moved so as to vary its discharge position relative to the aluminum electrode 20. As a result, the selenium electrode 21 was melted and caused to interfuse with the surface of the aluminum electrode 20, and a contact surface 23 of aluminum and selenium was formed.

Excess selenium on the contact surface formed on the surface of the aluminum electrode was removed, said contact surface was enclosed, and its electrical resistance was measured, whereupon it was found to have a rectifying action as a rectifying element.

In view of the fact that, in the above-described application, the selenium rectifying element produced by the method of this invention has rectifying action, it is obvious that, in the said selenium rectifying element, selenium has been diffused into the aluminum surface, and an electrical surface phenomenon has been created. This result indicates that the method of the present invention, without being limited to the diffusion of aluminum and selenium, is effective also in the production of such elements as, by way of example: a PbS element, which has photoconductive action; an Au—N-type Ge element, which has a photoelectric effect; and a $Bi_2Te_3$ element for the Peltier effect.

Figure 4:
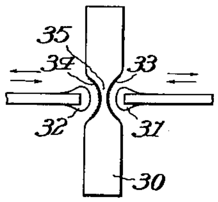
FIG. 4 is a schematic view showing the electrode parts of an embodiment for the production of a PN-type junction element.

The details of the aspect of the invention relating to the production of P-N junction elements by causing diffusion, into a single-element semiconductor or an intermetallic compound semi-conductor, of a separate impurity element will be better understood from the following description taken in conjunction with FIG. 4. A semiconductor 30 which has been necked or narrowed in thickness at one portion thereof by suitable etching of the surfaces of its two sides is disposed between two elements 31 and 32, which are in mutually opposed juxtaposition. Through the utilization of electric spark discharging, the two said elements are caused to diffuse into the surfaces of their respective sides, the element 31 on one side being an element of group III of the periodic table, and the other element 32 on the opposite side being an element of group V. In this process, by connecting the semiconductor 30 to the negative terminal of the power source and the impurity element 31 or 32 to the positive terminal and causing electric spark discharging to take place, diffused surfaces are formed on the surface of the semiconductor 30.

At the diffused surface 33 due to the group III element, formed on one of the etched portions of the semiconductor 30, a P-type impurity semiconductor is produced; and at the diffused surface 34 due to the group V element, an N-type impurity semiconductor is produced. The P-type and N-type impurity semiconductors formed on the two surfaces of the aforesaid semiconductor 30 are disposed in opposed juxtaposition with a transition region 35 situated therebetween, whereby a P-N junction element is produced.

Although the foregoing description of the production of the P-N junction element indicated in FIG. 4 has dealt principally with a P-N junction rectifying element, it is to be understood that the effectiveness of the method of the present invention is not necessarily limited to the production of only rectifying elements. It will be fully appreciated that the method of the invention is effective for the production of all elements wherein P-N junctions are utilized, for example, an element which has photoelectric effect.

Furthermore, the junction element producible by the method described above is not limited to a P-N junction element. That is, by successively repeating the process described in conjunction with FIG. 4, it is possible to produce junction elements as necessary, such as PNP, NPN, PNPN, and NPNP.

For example, for the production of a PNP element, a semiconductor 30 is connected to the negative terminal; a diffused surface of a group III element is prepared on one side of the said semiconductor 30; and a diffused surface of a group V element is prepared on the other side thereof. Next, on the diffused surface of the group V element, a semiconductor element is caused to diffuse. Then, on the resulting surface, a diffused surface of a group III element is further caused to form. Finally, by connecting a lead wire to each of the diffused surfaces thus formed, it is possible to produce a PNP element.

The foregoing description has dealt with a method of producing semiconductors wherein two or more elements capable of functioning as a semiconductor by mutually interdiffusing are adapted as discharge electrodes, and electric spark discharging is caused to take place therebetween. However, it is possible to produce semiconductors without the necessity of causing diffusion as described above through the utilization of the said electric spark discharging. That is, during the generation of this type of electric spark discharging, an extremely high pressure and high temperature are developed. The values of this pressure and temperature, of course, depend on the capacity of the electric power source used for generating spark discharging, but when a condenser is utilized as the said power source, and electric spark discharging is caused to take place, a pressure and temperature of the order of $10^3$ kg./cm.$^2$ and $10^3$ ° C., respectively, are instantaneously developed, depending on the capacitance of the said condenser, and are imparted on the discharge electrodes. Accordingly, their influence causes compositional changes in the electrodes, specifically, changes also in the material crystalline structure of the said electrodes. It is possible, through the utilization of this phenomenon, to produce semiconductors of this type. That is, by adapting a portion of the surface of the rough semiconductor material as one of the electrodes, disposing a separate electrode as the opposite electrode, and causing electric spark discharging to take place between said two electrodes, the said one portion of the said rough material surface is caused to change its composition and become a material of another type. Moreover, the boundary surface between the said surface portion and other portions which have not been subjected to compositional change becomes a coupling surface. Thus, a semiconductor is produced.

The above-described aspect of the invention will be better understood by reference to the following example of a case wherein carbon is used as the rough material. As is known in the art, carbon of this type has the properties of the P-type or those of the N-type. For example, if an electrode is disposed opposite a P-type carbon, and electric spark discharging caused to be generated between the two electrodes by the discharging of a condenser as aforementioned, the region in the proximity of the discharge point of the said carbon will be heated to a high temperature, and a high pressure will be imparted. As a result the portion subjected to these conditions will be converted into a portion of N-type, a contact surface of P-type and N-type will be obtained from the basic carbon and the aforesaid portion of N-type, and a semiconductor of PN coupled type will be produced. Of course, if an N-type carbon is used as the basic carbon, a semiconductor of the same type as mentioned above will be similarly produced.

Although semiconductors composed of elements from groups III and V of the periodic table have been discussed principally above, it will be understood that such semiconductors may also be formed by the diffusion of an element from one of the groups II and VII into an element of the other group or a single-element, inherently semiconductive, material into an element other than one of group IV, or vice versa.

If necessary, the above-described electric spark discharging may be accomplished in an environment of an inert gas or within a liquid, whereby the infiltration of undesirable impurities during the discharging process can be prevented.

As can be seen from the foregoing description, the present invention makes it possible to obtain, in a simple manner by a new method, diffused surfaces of the same types as those which, heretofore, could be obtained only by heat treatment under complex, controlled conditions.

The process of depositing, on the surface of a metal, another metal by utilizing electric spark discharging, similarly to the method of the present invention, has been practiced heretofore. However, such conventional depositing of metal has hitherto been practiced principally for the purpose of hardening the surface of the base metal as, for example, in the fusion depositing of tungsten carbide or titanium on surfaces of steel. Also, as an example of this practice of purposes other than hardening of surfaces, reference may be made to the inscribing of letters, numerals, and symbols on the surface of copper by fusion depositing silver on the said copper surface as practiced hitherto.

As a result of analyzing, by means of an X-ray analyzer, fusion deposited metals deposited in the conventional manner it was verified that, in the fusion deposited portion, both metals are mutually interfused, and a diffused surface exists. The method of the present invention was developed from this verification.

While I have described a few particular embodiments of the various aspects of my invention, it will, of course, be understood that I do not wish my invention to be limited thereto, since many modifications may be made and I, therefore, contemplate by the appended claims to cover all such modifications as fall within the true spirit and scope of my invention.

What I claim is:

1. A method of producing semiconductive material from at least two elements constituting a semiconductor in an interdiffused solid state of said elements, comprising the steps of forming at least one of said elements as an electrode body, juxtaposing said electrode body with a body of the other of said elements, and energizing said electrode with an electric current to generate an electric spark at said electrode contacting said body of said other element and of an intensity sufficient at least partly to disintegrate one of said bodies at a region thereof confronting the other body and to deposit said one element on said body at a temperature sufficient to cause diffusion of said element of said one of said bodies into said other body.

2. A method of producing semiconductive material from at least two elements constituting a semiconductor in an interdiffused solid state of said elements, comprising the steps of forming two of said elements as respective electrode bodies, juxtaposing said electrodes, and energizing said electrodes with an electric current to generate an electric spark discharge between said bodies of an intensity sufficient at least partly to disintegrate one of said bodies at a region thereof confronting the other body, thereby interdiffusing said elements.

3. The method according to claim 2 wherein the elements paired in constituting said semiconductor are selected from the group which consists of an element from group II together with an element from group VII of the periodic classification; an element from group III together with an element from group V of the periodic classification; an element which constitutes a single-element semiconductor together with an element from a group of the periodic classification other than group IV; and one element which constitutes a single-element semi-conductor together with another element constituting a single-element semiconductor.

4. A method according to claim 2 wherein at least one of said electrode bodies is formed by depositing a respective element upon a metallic base.

5. A method of producing semiconductive material from at least two elements constituting a semiconductor in an interdiffused solid state of said elements, comprising the steps of forming two of said elements as respective electrode bodies, juxtaposing said electrodes, intermittently displacing at least one of said bodies into engagement with the other, and concurrently energizing said electrodes with an electric current to generate an electric spark discharge between said bodies of an intensity sufficient at least partly to disintegrate one of said bodies at a region thereof confronting the other body and to deposit said element of said one of said bodies on said other body at a temperature sufficient to cause diffusion of said element of said one of said bodies into said other body.

6. A method of producing semiconductive material from at least two elements constituting a semiconductor in an interdiffused solid state of said elements, comprising the steps of forming two of said elements as respective electrode bodies, juxtaposing said electrodes, and energizing said electrodes with an interrupted direct electric current to generate an electric spark discharge between negatively and positively charged ones of said bodies of an intensity sufficient at least partly to disintegrate said positively charged body at a region thereof confronting said negatively charged body and to deposit said element of said positively charged body on said negatively charged body at a temperature sufficient to cause diffusion of said positively charged body into said negatively charged body.

7. A method of producing semiconductive material from at least two substances constituting a semiconductor in an interdiffused state of said elements, comprising the steps of forming two of said substances as respective electrode bodies, juxtaposing said electrodes, and energizing said electrodes with an electric current to generate an electric spark discharge between said bodies of an intensity sufficient to at least partly disintegrate one of said bodies at a region thereof confronting the other body and to deposit said substance of said one of said bodies on said other body at a temperature sufficient to cause diffusion of said substance of said one of said bodies into said other body, at least one of said substances being a substance selected from the group which consists of an intermetallic semiconductor, an element which constitutes a single-element semiconductor, and an impurity semiconductor.

8. The method according to claim 7 wherein the other of said substances is selected from the group which consists of a substance other than that comprised in said one substance and selected from the group which consists of an intermetallic semiconductor, an element which constitutes a single-element semiconductor, and an impurity semiconductor.

9. A method of producing semiconductive material from at least three elements constituting a semiconductor in an interdiffused solid state of said elements, comprising the steps of forming two of said elements as respective electrode bodies; juxtaposing said electrode bodies; energizing said electrode bodies with an electric current to generate an electric spark discharge between said bodies of an intensity sufficient at least partly to disintegrate one of said bodies at a region thereof confronting the other body and to deposit said element of said one of said bodies on said other body at a temperature sufficient to cause diffusion of said element of said one of said bodies into said other body, said semiconductor comprising a third element interdiffused with said two elements; and disposing a body of said third element adjacent said spark discharge.

10. A method of producing semiconductive material from at least three elements constituting a semiconductor in an interdiffused solid state of said elements, comprising the steps of forming two of said elements as respective electrode bodies; juxtaposing said electrode bodies; energizing said electrode bodies with an electric current to generate an electric spark discharge between said bodies of an intensity sufficient at least partly to disintegrate one of said bodies at a region thereof confronting the other body and to deposit the element of said one of said bodies on said other body at a temperature sufficient to cause diffusion of said element of said one of said bodies into said other body, said semiconductor comprising a third element interdiffused with said two elements; and immersing said electrode bodies in the region of said spark discharge in a gas containing said third element.

References Cited in the file of this patent

UNITED STATES PATENTS

| | | |
|---|---|---|
| 2,273,819 | Cooke et al. | Feb. 24, 1943 |
| 2,610,386 | Saslaw | Sept. 16, 1952 |
| 2,957,974 | Gallagher | Oct. 25, 1960 |